(12) United States Patent
Chow et al.

(10) Patent No.: US 8,036,128 B2
(45) Date of Patent: Oct. 11, 2011

(54) METHOD FOR COMMUNICATING BACKPRESSURE MESSAGES IN A DATA COMMUNICATIONS SYSTEM

(75) Inventors: Joey Chow, Nepean (CA); Mark Megarity, Ottawa (CA)

(73) Assignee: Alcatel Lucent, Paris (FR)

( * ) Notice: Subject to any disclaimer, the term of this patent is extended or adjusted under 35 U.S.C. 154(b) by 265 days.

(21) Appl. No.: 11/905,239

(22) Filed: Sep. 28, 2007

(65) Prior Publication Data
US 2009/0086636 A1    Apr. 2, 2009

(51) Int. Cl.
*G01R 31/08* (2006.01)
(52) U.S. Cl. .......................................................... 370/236
(58) Field of Classification Search .................. 370/473, 370/229–236, 241, 353, 365, 389, 400, 463, 370/470, 474
See application file for complete search history.

(56) References Cited

U.S. PATENT DOCUMENTS

| | | | |
|---|---|---|---|
| 4,486,739 A | | 12/1984 | Franaszek et al. |
| 4,630,260 A | * | 12/1986 | Toy et al. ..................... 370/355 |
| 6,396,809 B1 | | 5/2002 | Holden et al. |
| 6,442,170 B1 | * | 8/2002 | Perlman et al. ............... 370/401 |
| 7,088,710 B1 | | 8/2006 | Johnson et al. |
| 7,161,906 B2 | * | 1/2007 | Dell et al. ..................... 370/231 |
| 7,406,030 B1 | * | 7/2008 | Rijsman ....................... 370/216 |
| 7,426,185 B1 | * | 9/2008 | Musacchio et al. ......... 370/235.1 |
| 2005/0005021 A1 | | 1/2005 | Grant et al. |
| 2005/0135421 A1 | * | 6/2005 | Chang et al. .................. 370/474 |
| 2006/0153238 A1 | * | 7/2006 | Bar-On et al. ................ 370/473 |
| 2008/0026734 A1 | * | 1/2008 | Srodzinski .................. 455/414.3 |
| 2008/0026735 A1 | * | 1/2008 | Lee ............................ 455/414.3 |

OTHER PUBLICATIONS

David Cole, Best Practices for Implementating a HOTLink Video Protocol for IR and Optical applications, Breat River Technology, Aug. 30, 2005.*

* cited by examiner

*Primary Examiner* — Kwang B Yao
*Assistant Examiner* — Jung-Jen Liu
(74) *Attorney, Agent, or Firm* — Kramer & Amado P.C.

(57) ABSTRACT

A method for communicating backpressure messaging over a serial encoded link is disclosed. Embodiments of the invention enable advanced backpressure signaling to be retrofitted into legacy systems to achieve performance improvements and support new or enhanced services. Specifically, such signaling enables per-context and per-priority backpressure signaling information to be conveyed by a backpressure message; thereby enabling flow control to be performed in accordance with a priority or context associated with a traffic flow, or flows, carried over the serial link.

12 Claims, 1 Drawing Sheet

METHOD FOR COMMUNICATING BACKPRESSURE MESSAGES IN A DATA COMMUNICATIONS SYSTEM

FIELD OF THE INVENTION

The invention is directed to communication networks and in particular to flow control in data communications systems.

BACKGROUND OF THE INVENTION

Backpressure signaling is a method of flow control used in data communications systems. It can be used on communication links between data communications systems, and also for communications between subsystems of data communications systems. Generally, the purpose of backpressure signaling is to prevent packet loss at receiver queues caused by overflowing those queues.

Legacy backpressure techniques typically employ simple on-off signaling. According to this technique, a receiver queue of a data communications system, upon crossing a fill-level threshold, causes a backpressure signal (e.g. halt) to be generated that is sent to the source of the packets. In the case of inter-system communication, the packet source would typically be a transmit buffer of another data communications system. In the case of intra-system communication, the packet source would typically be an egress queue of a sub-system and the receiver queue would be an ingress queue of another subsystem. The backpressure signal (halt) indicates to the source that it should suspend sending packets to that queue until further notice, which will be given in the form of another backpressure signal (e.g. resume). In some cases there can be more than one packet source, and in those cases the backpressure signal would normally be sent to all of those sources. This technique has been highly successful in communications systems because it is simple to implement; requiring only a limited amount of information to be sent back to the transmitting source to process.

More advanced backpressure techniques are known that offer more than simple on-off signaling. These include techniques employing progressive throttling of a packet flow to a queue as successively higher fill-level thresholds are exceeded at the queue. Other techniques have means for applying backpressure to packets of only certain priorities. Generally, more advanced backpressure techniques require more information to be sent back to a packet source via advanced backpressure signaling.

With the introduction of advanced backpressure techniques, the problem of how to overlay these new techniques onto legacy systems arises. Specifically, in the case of priority based backpressure, the amount of information that needs to be communicated to a packet source increases and the problem becomes how to send this information back to the transmitting source over the existing infrastructure that was designed to handle a simple backpressure technique.

Accordingly, there is a need to provide advanced backpressure signaling capability in a legacy system to gain the advantages that such signaling offers without requiring substantial redesign of the system.

SUMMARY OF THE INVENTION

It is an object of the invention to provide a method and apparatus for backpressure signaling in a data communication system.

According to an aspect of the invention there is provided a method of communicating an in-band backpressure signaling message over a serial encoded link. The method comprises the steps of: forming a start of protocol data unit (PDU) delineator for a backpressure message PDU from a control character and a data character, the latter representing the length of the backpressure signaling message; appending the backpressure signaling message to the delineator to form the backpressure message PDU; and transmitting the backpressure message PDU on the serial encoded link.

Embodiments of the invention incorporate backpressure signaling capability into an existing in-band 8B10B encoded delineation scheme to communicate advanced backpressure messages over a serial link. Accordingly, an 8B10B control character is identified to form part of the start of PDU delineator of the backpressure PDU. In some embodiments of the invention that can be implemented on a legacy data communication system, this use of the control character may need to be reassigned from a previous use or explicit non-use. In these cases, modification to existing 8B10B encoders and decoders used in connection with the serial link are required to enable this character reassignment.

Advantageously, by replacing 8B10B control characters used for serial link timing functions with an 8B10B control character that identifies a backpressure message and supports the timing functions, some embodiments of the invention gain benefits of advanced backpressure signaling techniques with little or no additional bandwidth consumed for communicating the backpressure message over the serial link.

Advantageously, embodiments of the invention enable legacy data communication systems to be upgraded with new functionality such as per-priority backpressure signaling and per-context backpressure signaling, both of which can be instrumental in achieving performance improvements and in supporting new or enhanced services.

BRIEF DESCRIPTION OF THE DRAWINGS

The invention will be further understood from the following detailed description with reference to the drawings, in which.

DETAILED DESCRIPTION

Figure 1:
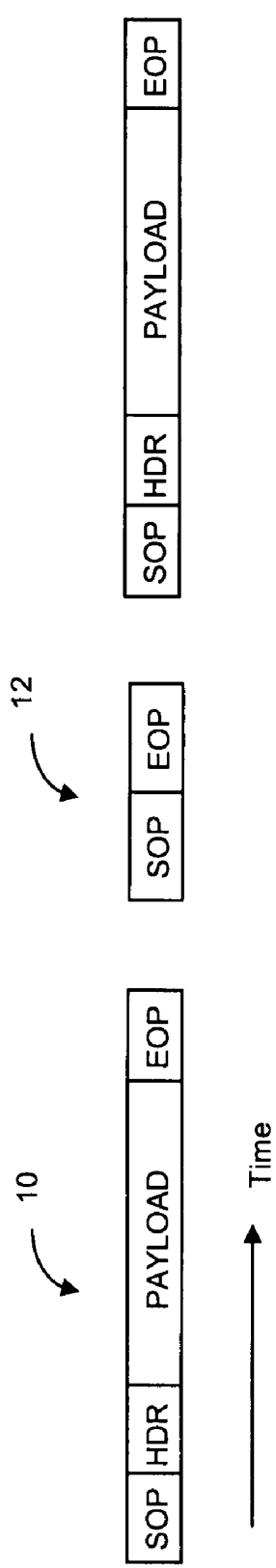
FIG. 1 illustrates typical information flow on an 8B10B encoded serial link as would be known in the prior art.

Referring to FIG. 1, message flow on an 8B10B encoded serial link includes protocol data units (PDUs) 10, 12 each having a start of packet (SOP) and an end of packet (EOP) delineator. According to the 8B10B encoding scheme known in the art, each of these delineators is two characters in length, a character being one byte. The control characters normally used as a SOP delineator are K28.2/K27.7, which are also referred to as SCP1/SCP2. The control characters normally used as an EOP delineator are K29.7/K30.7, which are also referred to as ECP1/ECP2. The PDU 10 in the depicted message flow further includes a data packet comprising a header (HDR) and payload for communicating data across the serial link. Hereinafter, the PDU 10 will also be referred to as a data packet PDU.

The PDU 12 in the depicted message flow consists of only an SOP and an EOP delineator. Although the PDU 12 does not include a data packet, and therefore does not communicate data across the serial link, it does serve a purpose. The purpose of the PDU 12 is to fill idle time on the serial link with state transitions to facilitate timing related operations such as clock recovery and bit alignment. Hereinafter, the PDU 12 will also be referred to as an idle link PDU. The length of the idle link PDU is four characters, or four bytes, since each delineator is two characters in length.

Figure 2:
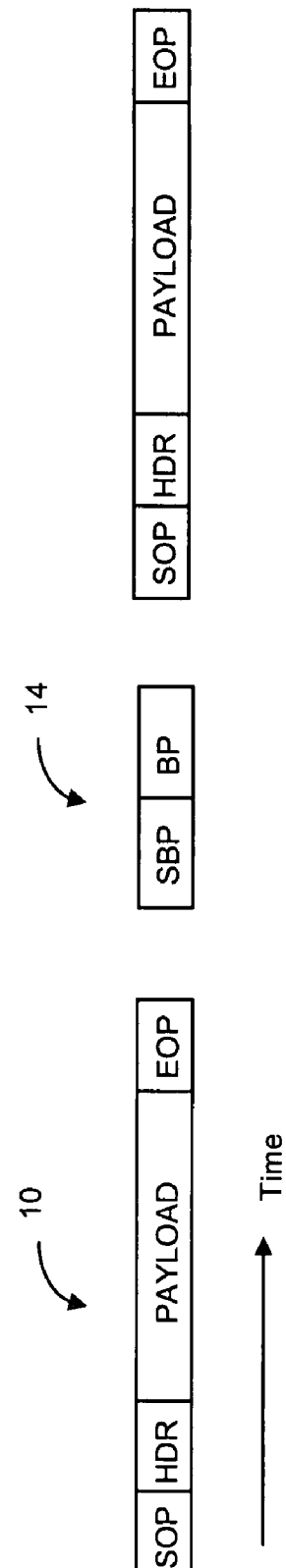
FIG. 2 illustrates backpressure messaging flow on an 8B10B encoded serial link of a data communication system according to an embodiment of the invention.

Referring to FIG. 2, according to an embodiment of the invention the idle link PDU has been replaced with another PDU 14. The PDU 14 has a new format that identifies it as carrying backpressure signaling information. As well as conveying backpressure signaling information, the PDU 14 also supports the timing related operations that the idle link PDU supported. Hereinafter, the PDU 14 will also be referred to as a backpressure message PDU.

A backpressure message PDU in some cases may have the same length as an idle link PDU that it replaces, and therefore the backpressure signaling information that the backpressure message PDU conveys in those cases consumes no additional serial link bandwidth over what was already being used by the idle link PDU. In other cases a backpressure message PDU may be longer than four characters. However, in these cases the benefit of the additional backpressure messaging conveyed offsets the loss of the additional serial link bandwidth used by the longer backpressure message PDU.

In FIG. 2, the backpressure message PDU 14 includes a start of backpressure (SBP) delineator followed by a backpressure message (BP). The SBP delineator is two characters long. It starts with an 8B10B control character, which may have previously been unused or was used to maintain timing and bit alignment on the serial link when the link was idle. This control character is followed by data character, which is an 8B10B encoded byte that represents the length of the backpressure message in bytes. The backpressure message BP is appended to the start of backpressure delineator SBP to form the backpressure message PDU 14. The backpressure message BP can be anywhere from two to 128 bytes long, in multiples of two bytes. The backpressure message PDU is transmitted on the serial encoded link to convey the backpressure message BP to a source of data packets, the flow of which may require control as determined by backpressure signaling information contained in the backpressure message BP.

In some cases a backpressure message PDU will replace an idle link PDU or other such PDU used to fill idle time on the serial link when there are no transmissions so that link timing and bit alignment can be maintained. However, the opportunity to make such a replacement should not be a limitation on sending backpressure messages as conveyed by the backpressure message PDU over the serial link. Therefore, in some cases a backpressure message PDU will be sent over the serial link as necessary to convey backpressure signaling to a packet source, or packet sources, even when there is no opportunity to have it replace an idle link PDU.

Details of 8B10B control characters and encoding used for conveying backpressure signaling information across an 8B10B encoded serial link, according to a preferred embodiment of the invention, will now be described. Table 1 lists twelve 8b10b control characters and their functions such as delineating PDUs across the serial link, and facilitating bit alignment and timing functions.

TABLE 1

8B10B Characters and Use

| Character | Name/Function |
| --- | --- |
| K28.0 | IDLE |
| K28.1 | COMMA |
| K28.2 | SCP1 |

TABLE 1-continued

8B10B Characters and Use

| Character | Name/Function |
| --- | --- |
| K28.3 | ALIGN |
| K28.4 | unused |
| K28.5 | COMMA |
| K28.6 | SUF2 |
| K28.7 | COMMA |
| K23.7 | CC |
| K27.7 | SCP2 |
| K29.7 | ECP1 |
| K30.7 | ECP2 |

Control characters are combined to form an ordered set of two characters. The ordered sets used on the serial link to define data packet PDU delineation are:

Start of packet = {SCP1/SCP2} = /K28.2/K27.7/
End of packet = {ECP1/ECP2} = /K29.7/K30.7/

A new ordered set (SBP) used to define the start of a backpressure message PDU is:
Start of backpressure (SBP)={SUF2/Data}=/K28.6/Dxx.y/
where Dxx.y is a data character representing the 8b10b encoding of the length of the backpressure message (BP) in bytes.

Advantageously, even with the addition of the new ordered set (SBP), communication systems that are not capable of decoding the new ordered set used to identify a backpressure message PDU would not be adversely affected since they would simple ignore the message.

With the addition of the new ordered set (SBP) to identify a backpressure message PDU, the serial link protocol can be expanded to convey backpressure signaling information. Advantageously, the backpressure message PDU can contain more information than simple on/off backpressure signaling, as will be described next.

The backpressure message PDU is defined as:

{SBP}/[BP]={SUF2/Length}/[Byte(1)/Byte(2)/ . . . /Byte(n)].

The backpressure message (BP) portion of the backpressure message PDU can be any length up to 128-bytes, in multiples of two bytes. The basic message building block is 2-bytes when only 1 context or priority needs to be addressed. In cases where backpressure signaling information needs to address multiple contexts or priorities, the backpressure message can be extended to support up to 64 contexts within the same message. This is illustrated in table 2.

TABLE 2

Basic 2-byte backpressure message format

| Bit | Use |
| --- | --- |
| bit(0) | parity |
| bit(1) | per-context flow control: {0 = no per-context flow control, 1 = per-context flow control on} |
| bit(2) | link-level flow control: {0 = no link-level flow control, 1 = link-level backpressure on} |
| bit(3) | priority flow control: {0 = no priority-based flow control, 1 = priority-based flow control on} |
| bit(4:5) | priority: {low, high, expedited, network control} |
| bit(6:9) | pad |
| bit(10:15) | context{0:63} |

One can appreciate from the definition of the basic 2-byte backpressure message (BP) format that the message supports traditional on/off link-level backpressure signaling via bit(2), per-context backpressure signaling via bit(1) and bits(10:15), and per-priority backpressure signaling via bits(3:5).

If more than one context needs flow control, then 2-bytes per context are appended to the basic backpressure message. Note that only the first 2-bytes of the backpressure message control the link-level backpressure status and the priority flow control status. All subsequent bytes in the backpressure message will be used only for per-context flow control, 2 bytes per context.

A context refers to a traffic flow on the serial link. There can be multiple traffic flows being carried by the serial link simultaneously. In general, each context can be associated with a destination to which data packets are being sent from data packet sources. For example, a context can be associated with a queue.

Per-priority backpressure signaling enables flow control to be performed on traffic flows carried on the serial link in accordance with the priority of each flow. For example referring to Table 2, setting bit(3)=1 enables priority flow control. With this enabled, setting bits(4:5)=00 causes flow control to only affect low priority traffic flows.

Numerous modifications, variations and adaptations may be made to the embodiment of the invention described above without departing from the scope of the invention, which is defined in the claims. For example, the embodiment of the invention described above is for an 8B10B encoded serial link. However, similar embodiments of the invention for other encoding schemes such as 64B66B and 64B67B are possible.

What is claimed is:

1. A method of communicating an in-band backpressure signaling message (IBSM) over a first serial encoded link, the method comprising:
   receiving, by a receiver of packets over a first serial encoded link, at least one protocol data unit (PDU) from a first data transmitter;
   forming, by the receiver of packets over the first serial encoded link, a backpressure message PDU when triggered by a contextual control scheme, the step comprising:
   forming a start of backpressure delineator (SBP), wherein the SBP includes a control character and a data character representing a backpressure message packet (BP) length between 2 and 128 bytes;
   appending, to the SBP, the BP that supports backpressure signaling operations, comprising a plurality of 2-byte data blocks, each 2-byte data block including a first plurality of bits corresponding to the contextual control scheme and a second plurality of bits comprising a BP context for the contextual control scheme, wherein the BP context is one of a plurality of contexts supported by the contextual control scheme;
   transmitting, by the receiver of packets, the backpressure message PDU on the first serial encoded link to the first data transmitter, wherein the first data transmitter uses a first BP context of a first 2-byte data block to modify the first serial encoded link; and
   transmitting, by the first data transmitter, the backpressure message to a second data transmitter over a second serial encoded link, wherein the second data transmitter sends at least one PDU to the first data transmitter, the first serial encoded link includes fewer contexts than the plurality of BP contexts fully encoded in the backpressure message, and the second data transmitter uses at least one BP context of the plurality of BP contexts to modify the second serial encoded link.

2. The method of claim 1, wherein the backpressure message PDU replaces an idle link PDU that occupies idle time on the first serial encoded link, and further wherein the backpressure message PDU supports a backpressure signaling operation and a timing operation.

3. The method of claim 2, wherein the length of the backpressure message PDU is equal to the length of the replaced idle link PDU.

4. A method of communicating an in-band backpressure signaling message (IBSM) over a first 8B10B serial encoded link, the method comprising:
   receiving, by a receiver of packets over the first 8B10B serial encoded link, at least one protocol data unit (PDU) from a first data transmitter;
   forming, by the receiver of packets over the first 8B10B serial encoded link, a backpressure message PDU when triggered by a contextual control scheme, the step comprising:
   forming a start of backpressure delineator (SBP), wherein the SBP includes an 8B10B control character and a data character representing a backpressure message packet (BP) length between 2 and 128 bytes;
   appending, to the SBP, the BP that supports backpressure signaling operations, comprising a plurality of 2-byte data blocks, each 2-byte data block including a first plurality of bits corresponding to the contextual control scheme and a second plurality of bits comprising a BP context for the contextual control scheme, wherein the BP context is one of a plurality of contexts supported by the contextual control scheme;
   transmitting, by the receiver of packets, the backpressure message PDU on the first 8B10B serial encoded link to the first data transmitter, wherein the first data transmitter uses a first BP context of a first 2-byte data block to modify the first 8B10B serial encoded link; and
   transmitting, by the first data transmitter, the backpressure message to a second data transmitter over a second serial encoded link, wherein the second data transmitter sends at least one PDU to the first data transmitter, the first serial encoded link includes fewer contexts than the plurality of BP contexts fully encoded in the backpressure message, and the second data transmitter uses at least one BP context of the plurality of BP contexts to modify the second serial encoded link.

5. The method of claim 1, wherein the number of contexts included in the backpressure message determines the length of the BP.

6. The method of claim 5, wherein the BP contains a 2-byte contextual data block for each BP context, wherein the BP includes a maximum of 64 2-byte contextual data blocks.

7. The method of claim 1, wherein each of the plurality of BP contexts enables each data transmitter to independently modify one of a plurality of serial encoded links.

8. The method of claim 4, wherein the control character in the SBP is one from the group of K28.0, K28.4, K28.6.

9. A system of communicating an in-band backpressure signaling message (IBSM) over a serial encoded link, the method comprising:
   a first serial encoded link that sends packets from a first data transmitter to a receiving device;
   the receiving device that forms a backpressure message protocol data unit (PDU) when triggered by a contextual control scheme and transmits the backpressure message PDU on the first serial encoded link to the first data transmitter, wherein:

the formation of the backpressure message PDU comprises forming a start of backpressure delineator (SBP), wherein the SBP includes a control character and a data character representing a backpressure message packet (BP) length between 2 and 128 bytes and appending, to the SBP, the BP that supports backpressure signaling operations comprising a plurality of 2-byte data blocks, each 2-byte data block including a first plurality of bits corresponding to the contextual control scheme and a second plurality of bits comprising a BP context for the contextual control scheme, wherein the BP context is one of a plurality of contexts supported by the contextual control scheme;

the first data transmitter that:

sends at least one PDU to the receiving device, receives the backpressure message PDU on the first serial encoded link from the receiving device, and uses a first BP context of a first 2-byte data block to modify the first serial encoded link; and a second serial encoded link that sends packets from a second data transmitter to the first data transmitter, wherein the first serial encoded link includes fewer contexts than the plurality of BP contexts fully encoded in the backpressure message; and the second data transmitter that sends packets to the first data transmitter and receives the backpressure message PDU on the second serial encoded link from the first data transmitter, wherein the second data transmitter uses at least one BP context of the plurality of BP contexts to modify the second serial encoded link.

10. The system of claim 9, wherein each of the plurality of BP contexts enables each data transmitter to independently modify one of a plurality of serial encoded links.

11. The system of claim 9, wherein the number of contexts included in the backpressure message determines the length of the BP.

12. The system of claim 11, wherein the BP contains a 2-byte contextual data block for each BP context, wherein the BP includes a maximum of 64 2-byte contextual data blocks.

* * * * *